United States Patent [19] [11] 4,440,814
Wolters [45] Apr. 3, 1984

[54] OFFSET TWO-STRIPE DECORATIVE MOLDING

[75] Inventor: Dennis R. Wolters, Dayton, Ohio

[73] Assignee: Protective Treatments, Inc., Dayton, Ohio

[21] Appl. No.: 393,404

[22] Filed: Jun. 29, 1982

[51] Int. Cl.³ .......................... B32B 3/04; B60R 13/04

[52] U.S. Cl. .......................................... 428/31; 52/716; 293/1; 428/124

[58] Field of Search ............................ 428/31, 57, 124; 52/716; 293/1

[56] References Cited

U.S. PATENT DOCUMENTS

| | | | |
|---|---|---|---|
| 3,687,792 | 8/1972 | Ruff | 52/716 X |
| 3,770,545 | 11/1973 | Jackson | 52/716 X |
| 3,811,989 | 5/1974 | Hearn | 428/31 X |
| 3,896,245 | 7/1975 | Seto et al. | 428/31 X |
| 4,308,704 | 1/1982 | Lloyd | 428/31 X |
| 4,368,224 | 1/1983 | Jackson | 428/31 |
| 4,379,114 | 4/1983 | Fujiki et al. | 428/57 X |

*Primary Examiner*—Henry F. Epstein
*Attorney, Agent, or Firm*—Dressler, Goldsmith, Shore, Sutker & Milnamow, Ltd.

[57] ABSTRACT

An elongated composite molding strip is disclosed having two laterally offset portions of different character which provide a two-stripe appearance. In this molding strip, a first adherent elastomer tape carries a decorative film positioned to cover one side of the tape with a first side margin of the film projecting beyond one side margin of the first tape, and being folded thereunder. A decorative molding is positioned on the uncovered side of the first tape, one side margin of the molding being coextensive with the other side margin of the first tape, and the other side margin of the molding extending over the adjacent side margin of the film. A second adherent elastomer tape underlies the first elastomer tape and is coextensive therewith so that the second elastomer tape traps the folded under side margin of the film and provides an exposed adherent surface.

6 Claims, 3 Drawing Figures

OFFSET TWO-STRIPE DECORATIVE MOLDING

TECHNICAL FIELD

This invention relates to a composite decorative molding strip wherein two offset portions of different character are undersurfaced with elastomer tape to provide a bondable structure having a two-stripe appearance.

BACKGROUND OF THE INVENTION

Elongated decorative moldings are well known and it is also known to employ such moldings with a striped appearance. Unfortunately, the moldings are costly and the striped appearance has been achieved by covering over a portion of the molding. It is also known to undersurface decorative moldings with elastomer layers for securing the moldings to a substrate, such as the side body of an automobile. However, the impact resistance which is developed is a function of the contact area and this is limited by the size of the molding. It is desired to develop a construction in which the contact area with the substrate is larger than the molding.

DESCRIPTION OF THE INVENTION

In accordance with this invention, an elongated composite decorative molding strip is formed of two superposed coextensive adherent elastomer layers and a top layer comprising two laterally offset decorative portions. The decorative portions may be of complementary or contrasting colors or materials to provide a two-stripe appearance. The first decorative portion is formed of a thin film, one side margin of which is covered by the adjacent side margin of the second decorative portion. The other side margin of the first decorative portion is folded over and trapped between the two superposed elastomer layers.

The composite molding strip of this invention is self-bonding because the lower elastomer layer has an adherent surface. This adherent surface is protected prior to use by a release layer.

In the preferred form of the invention, the first decorative portion is a thin strip of polyvinyl chloride film, while the second decorative portion is an extruded plastic or metal molding, such as aluminum, having a decorative surface formed on the side thereof remote from the elastomer layer.

As will be seen, the elastomer layers serve two functions in that they hold the composite trim strip together, and they also serve to bond the composite trim strip to an underlying support. It will also be evident that the surface area of securement to the underlying support is considerably larger than the cross-sectional area of the elongated molding which forms a portion of the decorative surface.

The composite molding strip of this invention is easily formed by positioning an elongated plastic film atop one side of a first elongated elastomer tape with a side margin of the film projecting beyond a first side margin of the elastomer tape, then, in either order, (1) positioning an elongated molding strip atop the uncovered side of the elastomer tape with one side margin thereof coextensive with the other side margin of the elastomer tape and with the other side margin thereof extending over the adjacent margin of the plastic film, and (2) folding the projecting margin of the plastic film under the elastomer tape, and then positioning a second elastomer tape, coextensive with the first, beneath the first elastomer tape to trap the folded over projecting margin of the plastic film between the two elastomer tapes.

The invention will be more fully understood from the accompanying drawings, in which.

Figure 1:
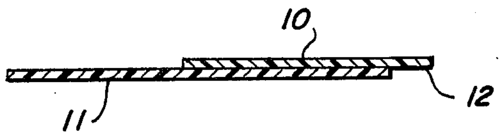
FIG. 1 is a side elevation, in section, illustrating the first step in forming the decorative strip of the instant invention.
Figure 2:
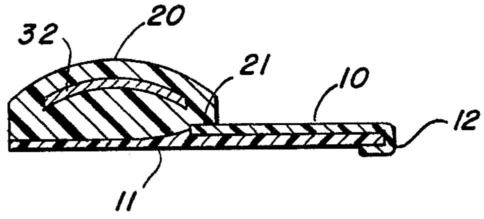
FIG. 2 is a side elevation, in section, illustrating the second step in forming the decorative molding of the instant invention.

Referring now to FIG. 1, a layer of decorative film 10 is positioned to cover one side portion of a strip or layer of elastomer tape 11, one side margin 12 of the film 10 projecting beyond the side margin of the elastomer tape 11. This permits the side margin 12 to be folded under the elastomer tape 11 to engage the undersurface thereof. The result is shown in FIG. 2, where side margin 12 has been folded under and extends a small distance inwardly along the bottom of the elastomer tape 11. FIG. 2 also shows a decorative molding 20 positioned on the uncovered side of the elastomer tape 11 such that molding 20 extends over the adjacent side margin 21 of the film 10 to protect the edge of the film.

Figure 3:
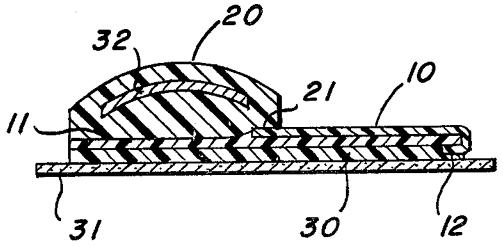
FIG. 3 is a side elevation, in section, of the completed decorative molding strip of the instant invention.

A second elastomer tape 30 is positioned beneath the first elastomer tape 11 which covers the folded under side margin 12 of the film, as shown in FIG. 3. Thus, both side margins 12 and 21 of the film 10 are protected.

First and second elastomer tapes 11 and 30 may be formed of any plasticized and sticky elastomer, such as butyl rubber. Preferred elastomer tapes are disclosed in U.S. Pat. No. 3,896,245. In the preferred form of the invention, the exposed adherent surface of the elastomer tape 30 is protected by a release layer 31, as is conventional.

The decorative molding 20 may be formed of clear plastic and it may include a reflective layer 32 which is visible through the exposed face of the molding 20. These are commonly formed by encapsulating a metalized polyester strip mounted on a base strip, but this is not significant to this invention.

The finished composite molding strip provides an offset two-stripe appearance, it is economical to manufacture, and it adheres easily and securely to a substrate, such as an automobile side body or bumper.

It is desired to point out that the second elastomer tape 30 may be omitted, in which event the side margin 12 which is folded under provides an unbonded side margin if the structure of FIG. 2 were directly bonded to a substrate. This unbonded side margin provides an opportunity to remove the bonded structure, and it is normally desired to avoid this. Nonetheless, in some circumstances this disadvantage can be tolerated or minimized by coating the folded over edge with a pressure-sensitive adhesive.

What is claimed is:

1. An elongated composite molding strip having two laterally offset portions of different character providing a two-stripe appearance comprising, a first adherent elastomer tape having a decorative film positioned to cover one side thereof, a first side margin of said film projecting beyond one side margin of said first tape and being folded thereunder, a decorative molding positioned on the uncovered side of said first tape, one side margin of said molding being coextensive with the other side margin of said first tape and the other side margin of said molding extending over the adjacent side margin of said film, and a second adherent elastomer tape underlying said first elastomer tape and coextensive therewith, said second elastomer tape trapping said folded under side margin of said film and providing an exposed adherent undersurface.

2. A molding strip as recited in claim 1 in which the exposed adherent undersurface of said second elastomer tape is covered with a release layer.

3. A molding strip as recited in claim 1 in which said decorative film is a film of polyvinyl chloride.

4. A molding strip as recited in claim 1 in which said molding has a decorative surface formed on the side thereof remote from said first elastomer tape.

5. A molding strip as recited in claim 1 in which said molding is a plastic extrusion.

6. An elongated composite molding strip having two laterally offset portions of different character providing a two-stripe appearance comprising, a first adherent elastomer tape having a decorative film positioned to cover one side thereof, a first side margin of said film projecting beyond one side margin of said first tape and being folded thereunder, a decorative molding positioned on the uncovered side of said first tape, one side margin of said molding being coextensive with the other side margin of said first tape and the other side margin of said molding extending over the adjacent side margin of said film, and said molding strip having an exposed adherent tape undersurface covered with a release layer.

* * * * *